United States Patent
Grassi et al.

(10) Patent No.: US 8,716,621 B2
(45) Date of Patent: May 6, 2014

(54) HEAD FOR THE CONTINUOUS PRECISION MACHINING ON THREE-DIMENSIONAL BODIES AND MACHINING EQUIPMENT THAT COMPRISES SAID HEAD

(76) Inventors: Fabrizio Grassi, Turin (IT); Graziano Rolando, Frossasco (IT)

( * ) Notice: Subject to any disclaimer, the term of this patent is extended or adjusted under 35 U.S.C. 154(b) by 432 days.

(21) Appl. No.: 13/201,826

(22) PCT Filed: Feb. 16, 2010

(86) PCT No.: PCT/EP2010/000934
§ 371 (c)(1),
(2), (4) Date: Aug. 16, 2011

(87) PCT Pub. No.: WO2010/094449
PCT Pub. Date: Aug. 26, 2010

(65) Prior Publication Data
US 2012/0111839 A1    May 10, 2012

(30) Foreign Application Priority Data

Feb. 18, 2009  (IT) ............................... MI2009A0210

(51) Int. Cl.
*B23K 26/08* (2006.01)
*B23K 26/20* (2006.01)
*B23K 26/38* (2006.01)
*B23K 37/02* (2006.01)

(52) U.S. Cl.
USPC .............. 219/121.6; 219/121.63; 219/121.67; 219/121.78

(58) Field of Classification Search
USPC ............... 219/121.6, 121.63–121.72, 121.78, 219/121.81
See application file for complete search history.

(56) References Cited

U.S. PATENT DOCUMENTS

| | | |
|---|---|---|
| 4,205,828 A | 6/1980 | Hooper et al. |
| 4,480,821 A | 11/1984 | Noll et al. |

(Continued)

FOREIGN PATENT DOCUMENTS

| | | |
|---|---|---|
| EP | 0985485 B1 | 7/2003 |
| FR | 2869559 B1 | 6/2007 |

(Continued)

OTHER PUBLICATIONS

PCT/ISA/220—Notification of Transmittal of the International Search Report and the Written Opinion of th International Searching Authority, for corresponding International Application No. PCT/EP2010/000934, mailed on May 12, 2010, including PCT/ISA/210—International Search Report completed on May 3, 2010, and PCT/ISA/237—The Written Opinion of the International Searching Authority, completed May 3, 2010.

*Primary Examiner* — Samuel M Heinrich
(74) *Attorney, Agent, or Firm* — Heslin Rothenberg Farley & Mesiti P.C.; Victor A. Cardona, Esq.

(57) ABSTRACT

A head for the continuous precision machining on three-dimensional bodies includes a fastening means to a flange of a machining equipment, having a first mechanical rotation axis, an intermediate means having a second mechanical rotation axis in series to the first mechanical rotation axis. The second mechanical rotation axis is orthogonal to the first mechanical rotation axis which intersects at a point of intersection. A terminal processing means has in series with the first and second mechanical rotation axes a third mechanical translating axis. The intermediate means has an arc configuration of a circumference with its centre at the point of intersection. The first mechanical rotation axis and the third mechanical translating axis are radially oriented to the arc.

23 Claims, 5 Drawing Sheets

(56) References Cited

U.S. PATENT DOCUMENTS 4,618,758 A 10/1986 Gilli et al.
4,687,901 A * 8/1987 Binder et al. ............ 219/121.67
4,728,771 A * 3/1988 Sartorio .................. 219/121.72

FOREIGN PATENT DOCUMENTS

| JP | 63230285 A | 9/1988 |
| JP | 8033994 A | 2/1996 |
| JP | 11170077 A | 6/1999 |

* cited by examiner

HEAD FOR THE CONTINUOUS PRECISION MACHINING ON THREE-DIMENSIONAL BODIES AND MACHINING EQUIPMENT THAT COMPRISES SAID HEAD

CROSS REFERENCE TO RELATED APPLICATIONS

This application is a 371 National stage of PCT International Application No. PCT/EP2010/000934, filed on Feb. 16, 2010, published in English on Aug. 26, 2010 as WO 2010/09449 A1, which claims priority to Italian Patent Application No. MI2009A000210 filed on Feb. 18, 2009, the entire disclosures of which are incorporated herein by reference.

The present invention relates to a head for the continuous precision machining on three-dimensional bodies and a machining equipment that comprises said head.

The machining equipment, referred to can be used for any precision machining, and can therefore be applied in the field of mechanical tool machining on continuous profiles of three-dimensional pieces, such as laser cutting and welding, oxygen cutting, high pressure water cutting, in surgery, tracking operations, surveying and measuring of profiles, milling, marking, gluing of continuous profiles, etc.

Figure 1:
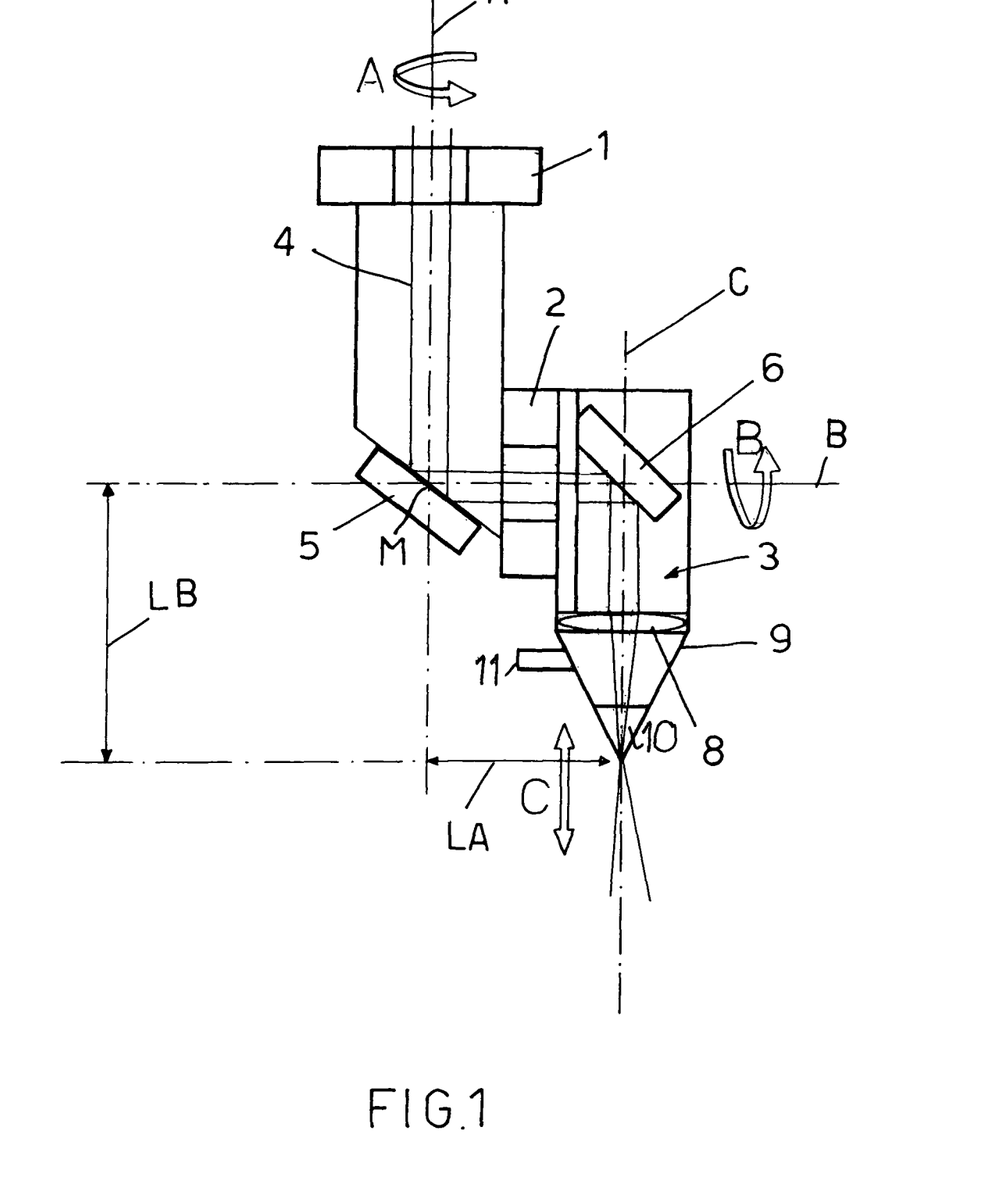
FIG. 1 shows the layout of a traditional laser cutting head.

With reference to the laser cutting and welding field, the head used in current industrial machinery generally has an architectural layout as shown in FIG. 1.

In FIG. 1, the head includes a fastening means 1 with a flange of the machining equipment, having a first mechanical rotation axis A, an intermediate means 2 having a second mechanical rotation axis B in series with the first mechanical rotation axis A, the second mechanical rotation axis B being orthogonal to the first mechanical rotation axis A with which it intersects at an intersection point M, and a terminal machining means 3 having in series with the first and second mechanical rotation axis of A, B a third mechanical translating axis C.

The unfocused laser beam 4 passes inside the head itself and is deflected by two mirrors 5, 6 positioned at 45° to the beam 4 itself. The two mirrors 5, 6 are also at 45° in relation to the two mechanical rotation axes A, B.

The terminal means 3, comprising a nozzle 9 coaxial to axis C, on a lens 8 which focuses the laser beam 4 upstream of the nozzle 9 which the laser cutting gas is injected into through the inlet pipe 11.

The movement of the nozzle is interlocked, with high dynamics, to the signal from a piece-nozzle distance sensor 10 (usually a capacitive sensor), so as to maintain a constant nozzle-piece distance during cutting, even in the presence of surface wrinkles or small surface defects of the piece during forming, that make the current profile different from the programmed theoretical profile.

This ensures the technological quality and consistency of the cut, as the point of focus remains in the same axial position relative to the surface of the piece, despite the presence of such defects. The focused laser beam makes the cut with the aid of a support gas that is injected through a pipe placed downstream of the focusing lens 8.

The essence of this architecture is that, in order to allow the laser beam 4 to pass through it, the nozzle 9 is positioned so that the focal point of the laser beam 4 has two rotation radii LA and LB following the operation of the head around the axis A and B, respectively.

The basic fact follows that with each rotation around the axes A and/or B (to change the orientation of the nozzle 9), a movement of the focal point from its original position along arcs will also occur. Therefore, if solely the orientation of the nozzle 9 needs to be altered, without changing the initial position of the focal point, the geometry of this head does not allow it, because it always involves a rotating shift of the focal point away from its initial position.

Figure 2:
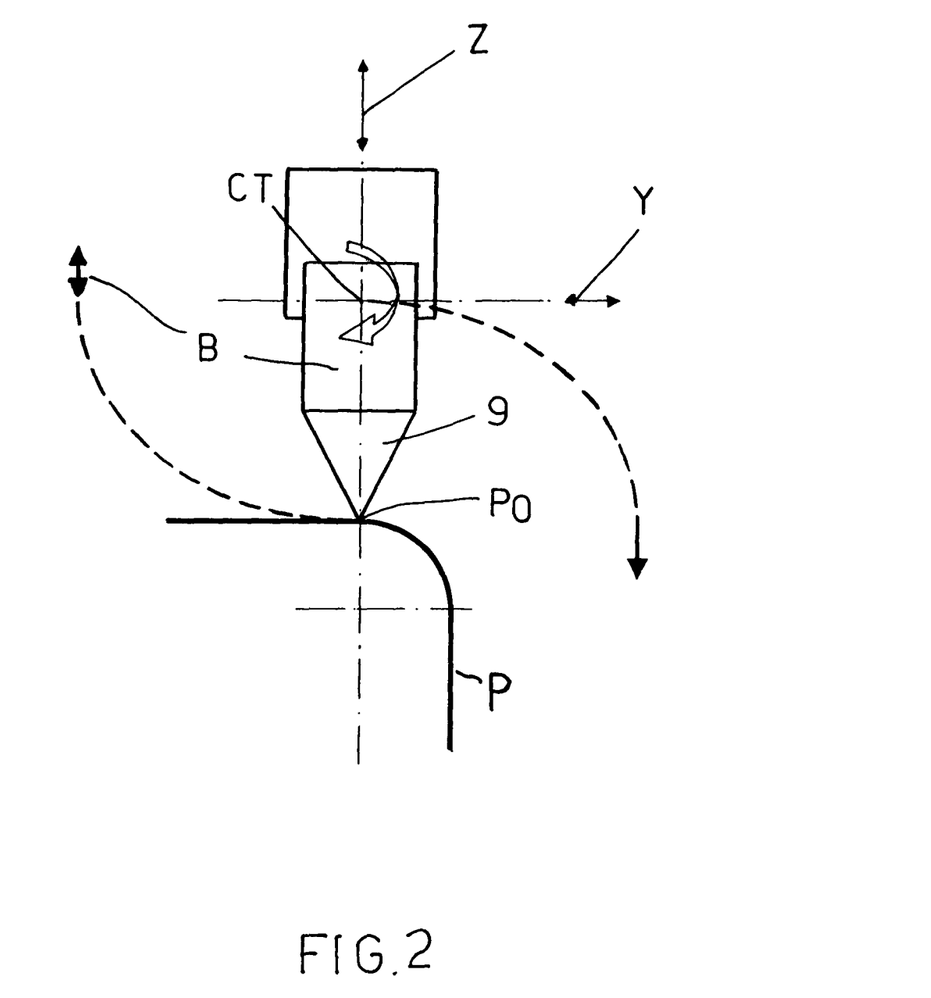
FIG. 2 shows the compensating motion of the head in FIG. 1.

With this head architecture, the cutting of a piece P bent at 90° or generally curved, as shown in FIG. 2, involves the directional change of the axis of the nozzle 9 to keep it orthogonal to the trajectory (as required by cutting technology), and therefore the movement of the head around the two rotation axes A and B.

If the head is mounted on a machine with Cartesian structure X, Y, Z, and solely the orientation of the nozzle 9 needs changing, due to the finite size of the rotation radii LA and LB, contemporary compensating circular movements are also required of the head centre CT (the intersection of axes A and B), by axes X, Y, Z of the machine, so that the end of the nozzle is kept on the programmed trajectory, as in FIG. 2, which illustrates the simple case of a 90° rotation of axis B.

FIG. 2 shows by a dotted line, for simplicity's sake, solely the compensating movement of the head centre CT compared with the 90° rotation around axis B (which essentially means that the end of the nozzle remains on the coordinates X0, Y0, Z0 of the rotation starting point P0, changing only the orientation of the nozzle 9). The trajectory movement of the head centre CT which follows the programmed profile to the nozzle, and which is superimposed in real time, to that of compensation, is not represented.

This type of composition of movements, in which the interpolation algorithms of axes X, Y, Z, as well as having to follow the programmed profile of the pieces, must also simultaneously generate the compensation movements caused by the rotations around axes A and B, when changes in orientation of the nozzle 9 are necessary, brings with it significant penalties in terms of speed, acceleration and accuracy of the resulting movement of the processing tool and vibrations that penalize the cutting technology, resulting in reduced productivity and the repeatability, accuracy and quality of the produced pieces.

Moreover, the resulting trajectory of the processing tool, even when it has to perform a simple rotation, is given by the sum of the simultaneous movement of many axes, the interlocking of which have various dynamic error characteristics between them and the calculation of the compensating motion of which, is purely mathematical, being carried out by the Numerical Control, and not the result of a very precise pure mechanical movement.

This fact depends on the large difference in mass and size of the travel between the machine and its machining head: in fact, while it is possible with current techniques to obtain the high acceleration operation of the head in relation to its axes A, B, C with, due to their low mass, it is not possible with current techniques, to obtain high acceleration machine operations in relation to the axes X, Y, Z, due to their large mass.

These dynamic capability differences between the machine and its head penalizes the ability to synchronize, in a precise and consistent manner, the combined movements that interest both axes A, B, and C, and axes X, Y and Z.

The attempt to adapt the dynamic capability of the machine to that of the head would entail a substantial increase in costs, the overall dimensions of the devices, so as not to present consequent vibrations and inaccuracies, and strengthening of the structures to support the inertial thrust, which render this solution impractical.

It follows that with this architecture the only way to achieve the required cutting specifications, is to reduce the dynamic capability of the head and adapt it to the machine, with resulting penalties in productivity and quality of the cut pieces, in that the laser process does not react well to variations of the cutting speed.

The technical aim of the present invention proposes is therefore to achieve a head for the continuous precision machining of three-dimensional bodies and a machining equipment that includes said heads to solve the technical disadvantages of the prior art.

Within the scope of said technical aim, one objective of the invention is to create a head for continuous precision machining of three-dimensional bodies and machining equipment that includes the said heads making it possible to increase productivity while maintaining or even increasing machining precision.

The technical aim, and these and other objectives, according to the present invention are achieved by making a head for continuous precision machining on three-dimensional bodies in accordance with claim 1.

Other characteristics of the present invention are defined, moreover, in the subsequent claims.

The new head may be mounted on the end flange of a classical Cartesian structure or on the end flange of any type of robotic structure (articulated, polar, anthropomorphic, cylindrical, etc.).

The new head, especially in robotics applications, provides greater dexterity and penetrability, being able to orientate itself with a greater degree of freedom for the machining of complex three-dimensional pieces, extending in an isotropic manner in all directions, including vertical.

Furthermore, it eliminates the need for the machine to perform compensating movements following operation of the head.

In essence, simple movements changing the orientation of the machining tool will correspond to simple and precise movements of one or, at most, two axes of the head.

Advantageously, operations of the head in relation to its mechanical axes are completely uncoupled from those of the machine in relation to its mechanical axes, so that the tasks of the machine and head are clearly defined and independent.

In particular, the operations of the machine may preferably be limited to slow translatory movements or paths with low curvature while operation of the head may regard orientation movements and/or movements at high angular and/or linear acceleration.

Furthermore, thanks to the uncoupling of the machine and head axes, the compensating movements of the head rotation axis by the mechanical Cartesian axis are no longer present.

The accuracy of the head's high dynamic movements is essentially determined by the precision of its mechanical construction and the ability of the head to rotate around a mechanical centre of rotation.

Additional characteristics and advantages of the invention will be more apparent from the description of a preferred but not exclusive embodiment of the head according to the invention, with reference to the attached drawings, wherein.

Figure 3:
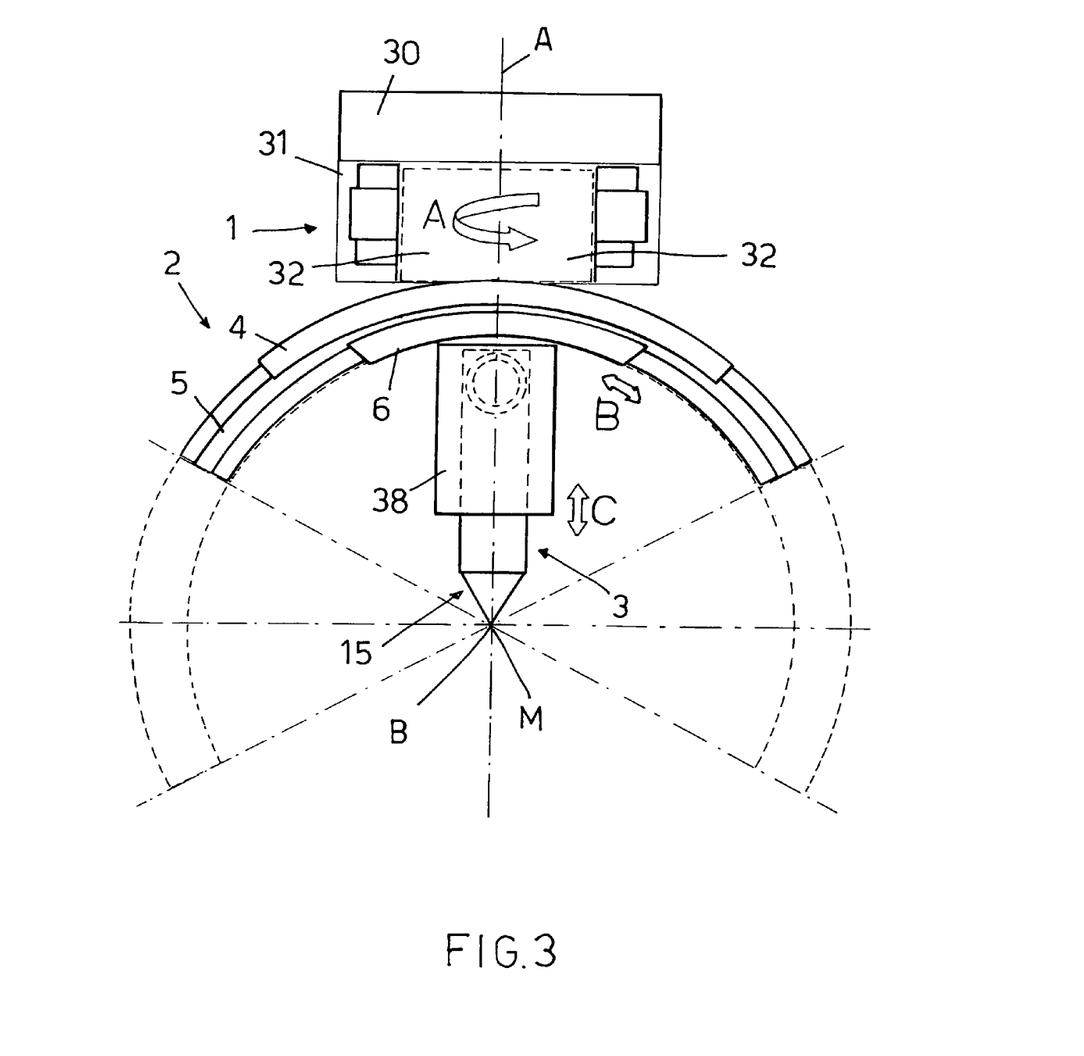
FIG. 3 shows a schematic front view of the laser cutting head in accordance with the invention.
Figure 4:
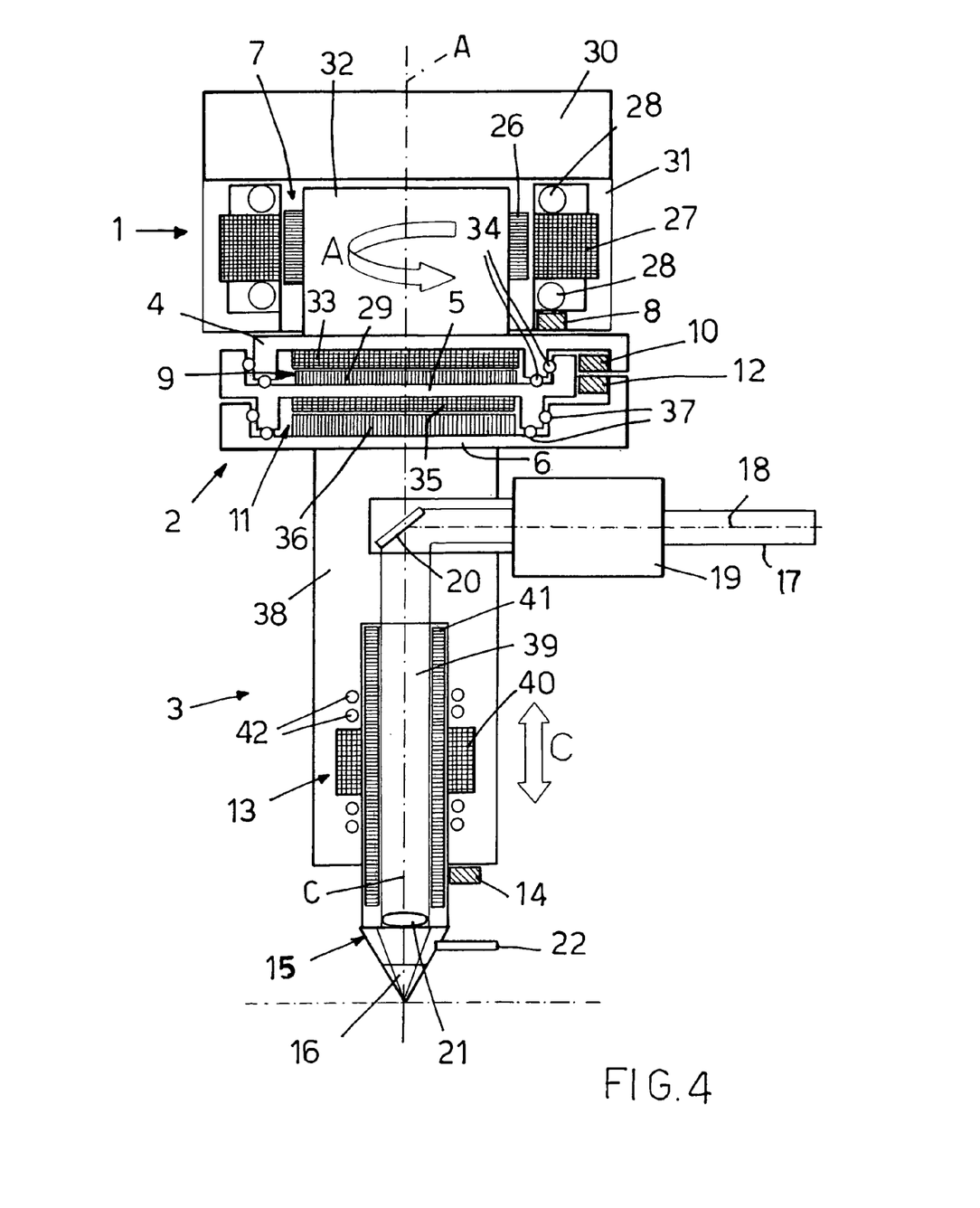
FIG. 4 ally shows a schematic side view of the head in FIG. 3 sectioned along a plane containing the mechanical axis A.

The head for continues precision machining on three-dimensional bodies, comprises a fastening means 1 to a flange 30 of a machining equipment, an intermediate means 2 and a terminal means 3.

The head described is intended for a laser cutting process, such as cutting of sheet metal in the automotive field, but the concept as such may be extended to other sectors.

The fastening means 1 presents a first mechanical rotation axis A, the intermediate means 2 presents a second mechanical rotation axis B in series with the first mechanical of rotation axis A, and the terminal machining means 3 presents in series with the first and second mechanical rotation axes A, B a third mechanical translation axis C.

The second mechanical rotation axis B is orthogonal to the first mechanical rotation axis A with which it intersects at a point of intersection M.

The intermediate means 2 is in the shape of an arc having a circumference with its centre at the point of intersection M.

Advantageously, the first mechanical rotation axis A and the third mechanical translation axis C are radially oriented to the arc.

In particular, the first mechanical axis A and the third mechanical axis C overlap in a reference configuration of the head.

The intermediate means 2 has a first support and guide part 4 integral with a part 32 of the fastening means 1 rotating around the first mechanical axis A, a second support and guide part 5 guided by the first part 4 in rotation around the second mechanical axis B, a third part 6 integral with a part 38 of the terminal means 3 and guided by the second part 5 in rotation around the second mechanical axis B independently from the rotation of the second part 5 around the second mechanical axis B.

The fastening means 1 has a direct motor 7 for driving the part 32 and a sensor 8 to detect the angular position, which reads the angle of rotation of part 32 of the fastening means 1 around axis A (axis A which is also the central axis of symmetry of the fastening means 1).

The direct motor 7 includes, in particular, a wound stator 27 integral to part 31 of the fastening means 1 fixed in relation to the flange 30, a permanent magnet rotor 26 integral to part 32 of the fastening means 1 rotating around the first mechanical axis A, and sliding bearings 28 between parts 31 and parts 32.

The second part 5 has a direct motor 9 for its actuation and a sensor 10 that detects its angular position in relation to the first part 4.

The direct motor 9 includes, in particular, a wound stator 33 integral to the first part 4, a permanent magnet rotor 29 integral to the second part 5, and sliding bearings 34 between the first part 4 and second part 5.

The third part 6 has a direct motor 11 for its actuation and a sensor 12 that detects its angular position in relation to the second part 5.

The direct motor 11 includes, in particular, a wound stator 35 integral to the second part 5, a permanent magnet rotor 36 integral to the third part 6, and sliding bearings 37 between the second part 5 and the third part 6.

The terminal means 3 has a direct motor 13 for its actuation and a sensor that detects its linear position 14.

In particular, the terminal means has a part 38 integral to the third part 6 and a part 39 translatable to the mechanical axis C.

The direct motor 13 shows a wound stator 40 integral to part 38, a permanent magnet cursor 41 integral to part 39, and sliding bearings 42 between part 38 and part 39.

In the case in point, the terminal means 3 include a nozzle 15 for laser cutting, coaxially positioned to the third mechanical axis C.

The nozzle 15 has, at its tip, a distance sensor 16.

Advantageously, the nozzle 15 includes an entry 17 for an optical fibre 18 for transmitting a laser beam.

Upstream of the nozzle 15 a collimator 19 of the laser beam, a mirror 20 for the reflection of the laser beam collimated along the axis of the nozzle 15 and a lens 21 capable of focusing the laser beam reflected at the tip of the nozzle 15 are placed.

Between the tip and the lens 21 of the nozzle 15 is an entry 22 for the process gas for laser cutting.

Given that the cutting and laser welding head does not use traditional optics with mirrors but rather an optical fibre for the transmission of the laser beam, it does not place constraints on the design choices for its architecture.

As a result, by using optic fibre it is possible for example to adopt the arc configuration of the mechanical axis B.

Moreover, the fact that it uses optic fibre means that the laser can enter downstream of the kinematics of the head and requires only one mirror, sending the laser parallel to the mechanical axis C, which greatly simplifies the geometric calibration of the laser beam.

Instead, in the prior art, the requirement to enter the beam upstream of the kinematics, with the two mirrors that must be strictly parallel to each other and at 45° to the mechanical axes A and B, significantly complicates the geometric calibration of the laser beam. This same use of an optic chain in the prior art determines the offsets LA and LB illustrated in FIG. 1, which in turn entail the need for the compensating movements of the trajectory.

The use of optic fibre also reduces the size of the head with increased precision, dexterity and dynamics.

Preferably the fastening means 1 and in particular its rotating part 32, has an angular excursion no less than ±360° around the first mechanical axis A, the second part 5 has, compared to the first part 4, an angular excursion no less than ±60° around the second mechanical axis B, and the third part 6 has, compared to the second part 5, an angular excursion no less than ±60° around the second mechanical axis B.

Furthermore, the terminal means 3, and in particular the translatable part 39, has a linear excursion preferably not less than ±40 mm.

The terminal means 3 has high dynamics to adapt to the small local variations in the surface of the piece to be cut, such as wrinkles, superficial blemishes, slight deviations of the surface from the nominal configuration. In this function, the terminal means 3 is subject to the signal of the piece-nozzle distance sensor 16. To perform this function, given the scale typical of surface defects stated above, travel of just a few mm would be sufficient, but as will be seen, the ability to perform a greater translatory travel is particularly useful in specific cutting applications.

The intermediate means 2 is structurally designed so as to duplicate the second mechanical axis B.

This structure is advantageous mainly for reasons of space (dexterity and penetrability) and greater possibility of preparing the head for the average progress of the piece being processed, to avoid interference with the piece itself.

This duplication enables the doubling of speed and acceleration in performing the critical movement consisting of rotation around a 90° angle, so that even on the sections with high curvature, the maximum cutting speed, typical of sections with low curvature, is not varied and decreased (technologically viable).

Such duplication of axis B also allows the shape of the head to be adapted to the shape of the current and future underlying piece and, by rotating the mechanical axis A, preparation of the cutting section according to current and planned progress so as to prepare the rotation of the mechanical axis B to the high curvature and allow the mechanical axis B to orientate itself to the piece, in real time.

The masses moved around the two mechanical sub-axes in which the second mechanical axis B divides are advantageously equivalent.

Thanks to the architecture herein described, the intermediate means 2 has a total angular travel of ±120° without interference with the piece being processed below.

Note that, as a result of the independence of both the concentric and parallel movements of the second part 5 and the third part 6, the travel structure and configuration of intermediate means can be adapted based on the shape of the piece being processed, in order to avoid collisions between the piece and the machining head and to prepare the shape of the head approximately to the instantaneous or planned shape of the piece below.

Note that, by moving the two axes B1 and B2 in the Push-Pull mode and synchronously, the configuration of the head can be changed by moving means 5 only, so that the terminal means 3 (the tool) is not altered, it does not change its orientation in relation to the piece and remains on the planned trajectory. This way, actuation of preparation of the head to the shape of the piece can be performed independently and in real time without affecting the orientation and movement of the tool.

Furthermore, when the point of focus (TCP Tool Centre Point) coincides with the mechanical rotation point M, axis A can be rotated without the said motion making the cutting point move out of the planned trajectory. The possibility of performing this rotation of axis A, either continuously or in anticipation of the approach of an edge, without affecting the programmed path, maintains the plane of rotation of axis B in the instantaneous cutting section, defined by the tool axis (axis C) and the velocity vector V of the cutting point, tangential to the trajectory.

This way, the tool axis C will be easily adjustable along the norm to the surface of the piece at the instantaneous processing point, rotating axis B only.

It thus appears that the said architecture of the head does not only make axes X, Y, Z of axes A, B, C independent, giving them separate tasks (predominantly translation for X, Y, Z and predominantly orientation for A, B) but also, for the same head, makes the tasks of the axes A, B, C independent of one another.

Some applications of the laser cutting head of car body sheet metal are described below.

The head is installed on a machine with Cartesian mechanical axes X, Y and Z.

Figure 5:
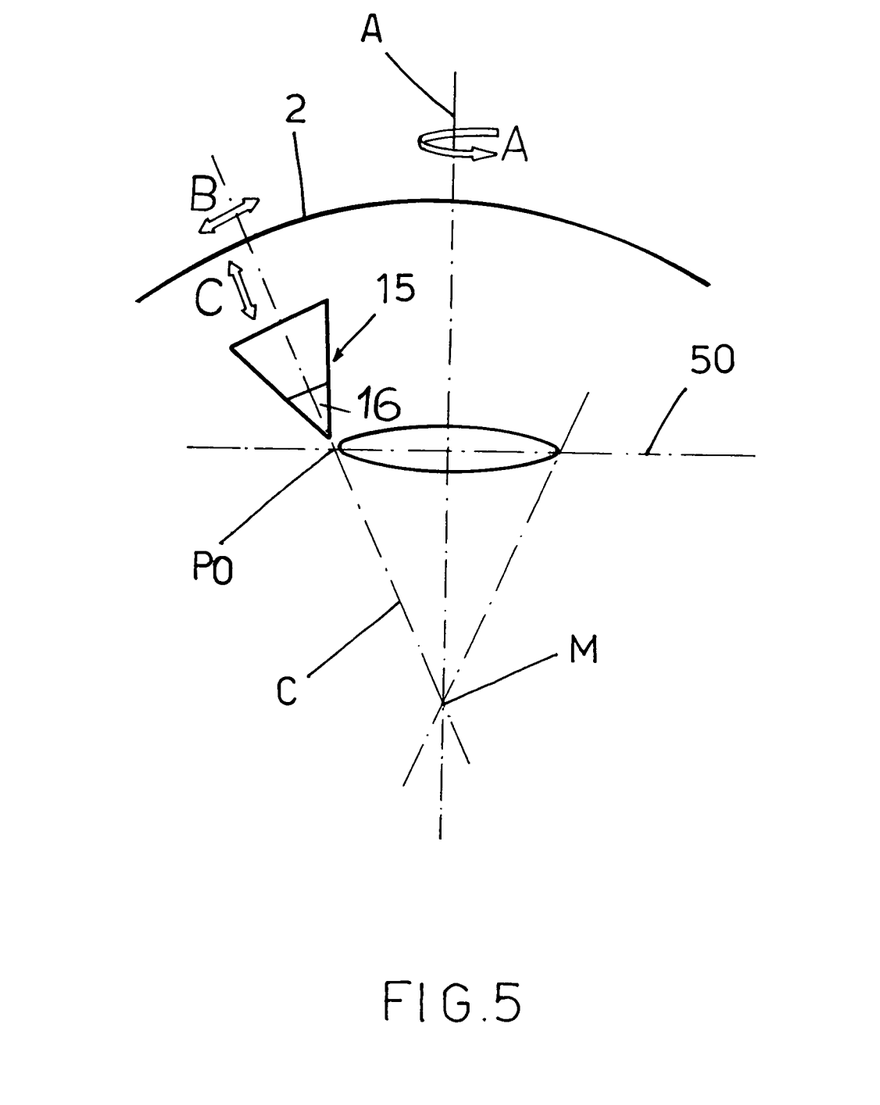
FIG. 5 shows an application of the head in FIG. 3 for the execution of a circular cut.

Reference is made to FIG. 5 wherein the movements of the head, in relation to the mechanical axes A, B and C, are indicated by arrows. Considering the nozzle 15 interlocked to sensor 16, the tip of the nozzle 15 is permanently positioned at a fixed distance, for example about 1.5 mm above the surface of a flat sheet 50 perpendicular to axis A, and with the focusing point P0 of the laser beam precisely on the surface of the sheet, i.e. in the optimal conditions for the cutting technology of car body sheet metal.

If, in this interlocking position, a preparation movement of, for example 20 mm, of the machine is carried out along the mechanical axis Z the whole head lowers, but without colliding with the sheet itself, in as much that the terminal means 3 moves upward by 20 mm due to the interlocking of the nozzle 15 to the sensor 16, which tends to keep the distance of the nozzle tip from the surface of the sheet unchanged. In this situation, the point of intersection M is "sunk" beneath the surface of the sheet by 20 mm. If, under these conditions, the intermediate means 2 is rotated around the second mechanical axis B, in particular by 30°, and then the laser is activated to begin cutting, rotating the fastening means 1 through 360° around the first mechanical axis A, a complete circle is cut of a radius equal to about 11.6 mm. This circle is given by the flat section of a half-opened cone of 30° that is 20 mm from its apex.

Similarly, holding firm the fastening means 1, if only the intermediate means 2 is rotated, for example from −30° to +30° from the central reference angular position, a straight cut is achieved of approximately 23.2 mm. If, at the end of the movement of the intermediate means 2, a movement of the fastening means 1 is started around the first mechanical axis A by 180°, a semicircle is cut.

Thus, by correctly interpolating the movements of the fastening means 1 and the intermediate means 2 around the mechanical axes A and B, all sorts of small local figures such as the resulting one, can be cut combining elementary sections of the conical and flat sheet metal in real-time.

A further important application of the same benefit is the cutting of the arc of a circumference (benchmark) of a profile such as that shown in FIG. 2. If the point of intersection M is placed in the centre of the high curvature arc of the piece and axis A is arranged so that the rotation plane B lies in the cutting section, it is quite clear that with the movement around the axis B only, the high speed cut of the arc can be made while simultaneously maintaining the orientation of the nozzle perpendicular to the trajectory. Note that the setup movements, such as the "sinking" of the point of intersection M (moving axis Z of the machine carrying the head downwards and that of the rotation around axis A so that the cutting section coincides with the plane of rotation B), occur in time covered during cutting of the previous straight section, and thus do not affect either productivity or quality, as the technological conditions (position of the focal point, and cutting speed) do not vary.

The head according to the invention, allows the direct integration of innovative mechanical axes that eliminate the need for complex and bulky mechanical devices (such as reduction gears and screws), making the mechanical structure of the mechanical axis coincide with its actuation motor and its position transducer, mounted directly on the mechanical axis. The engine essentially identifies and integrates with the mechanical axis itself.

The elimination or reduction of mechanical and electrical actuation and transduction interfaces increases accuracy, reduces the complexity of construction, and the overall dimensions and costs. The direct actuation greatly increases the dynamic range and accuracy of movement of the mechanical axes, due to the elimination of play and elasticity induced by the power train used in traditional solutions, and makes it possible to adapt the shape of the motor to the geometry of the axis itself (linear, cylindrical, circular arc, etc.), and to adopt a greater number of mechanical axes within a confined space thanks to the power train and components reduced to their essentials. In practice, the mechanical axes are reduced to slide guides, the supporting mechanical structure of the axis itself, the windings and the stator and rotor magnets, and the position transducers.

The possibility for the head to rotate mechanically around the fixed point of intersection M eliminates the need for the compensating movement of the machine that mounts the head and makes the mechanical axes of the head completely independent of the machine.

The actuation of the head around its mechanical axes without the involvement of the mechanical axes of the machine that mounts the head, makes highly dynamic and precision cutting of sections with high curvature possible and increases the accuracy of the orientation trajectory of the tool axis.

In fact, while in a traditional head this movement necessarily involves a compensating movement around a centre of rotation mathematically calculated by the numerical control and performed with the aid of high inertia mechanical axes such as those of the machine, in this innovative head said movement is created around a mechanical point which is the point of intersection M that can be achieved with the constructional accuracy and precision of mechanics.

The high speed cutting system that can be obtained on the sections of low curvature (where it is essentially the mechanical Cartesian axes of the machine to move the tool) can also be obtained in sections with high curvature (where it is essentially the mechanical axes of the head to move the tool) without interruption, with a significant increase in productivity, accuracy and repeatability of the parts produced.

The head thus conceived is susceptible to numerous modifications and variants, all falling within the inventive concept; moreover, all details are replaceable by technically equivalent elements.

In practice, the materials used, as well as the dimensions, may be chosen at will according to requirements and the state of the art.

The invention claimed is:

1. A head for the continuous precision machining on three-dimensional bodies, comprising: a fastening means to a flange of a machining equipment, with a first mechanical rotating axis, an intermediate means with a second mechanical rotating axis in series with said first mechanical rotating axis, said second mechanical rotating axis being orthogonal with reference to said first mechanical rotating axis, with which it intersects at an intersection point, and a terminal machining means having in series with said first and second mechanical rotating axes a third mechanical translation axis, said intermediate means having a shape of an arc of a circumference the centre of which is located at said intersection point, and said first mechanical rotating axis and said third mechanical translation axis being oriented radially to said arc, wherein said intermediate means comprises a first support and guide part, a second support and guide part guided by said first part for rotating around said second axis, a third part guided by said second part for rotating around said second axis (B) independently of the rotation of said second part around said second axis.

2. A head for the continuous precision machining on three-dimensional bodies as claimed in claim 1, wherein said intersection point is a fixed mechanical rotation centre.

3. A head for the continuous precision machining on three-dimensional bodies as claimed in claim 1, wherein said first mechanical axis and said third mechanical axis overlap at a reference configuration of said head.

4. A head for the continuous precision machining on three-dimensional bodies as claimed in claim 1, wherein said first support and guide part is integral with a part of said fastening means rotating around said first axis, and said third part is integral with a part of said terminal means.

5. A head for the continuous precision machining on three-dimensional bodies as claimed in claim 1, wherein said fastening means has a direct motor integrated therein for actuating said part of said rotating fastening means around said first axis, and a sensor for detecting the angular position of said part of said rotating fastening means around said first axis.

6. A head for the continuous precision machining on three-dimensional bodies as claimed in claim 1, wherein said second part has a direct motor integrated therein for its actuation, and a sensor for detecting its angular position relating to said first part.

7. A head for the continuous precision machining on three-dimensional bodies as claimed in claim 1, wherein said third part has a direct motor integrated therein for its actuation, and a sensor for detecting its angular position relating to said second part.

8. A head for the continuous precision machining on three-dimensional bodies as claimed in claim 1, wherein said terminal means has a direct motor integrated therein for actuating one of its parts able to translate with reference to said third axis and a sensor for detecting the linear position of said part able to translate with reference to said third axis.

9. A head for the continuous precision machining on three-dimensional bodies as claimed in claim 5, wherein each motor is structurally shaped according to the geometry of the part which it actuates.

10. A head for the continuous precision machining on three-dimensional bodies as claimed in claim 1, wherein said terminal means has a nozzle for laser cutting coaxially with said third mechanical axis.

11. A head for the continuous precision machining on three-dimensional bodies as claimed in claim 10, wherein said nozzle for laser cutting has at its tip a distance sensor.

12. A head for the continuous precision machining on three-dimensional bodies as claimed in claim 10, wherein said nozzle for laser cutting has an entry for an optical fibre for transmitting a laser beam.

13. A head for the continuous precision machining on three-dimensional bodies as claimed in claim 12, wherein said entry for said optical fibre is located downstream with reference to the kinematics of said head.

14. A head for the continuous precision machining on three-dimensional bodies as claimed in claim 13, wherein said nozzle has upstream a collimator of the laser beam, a mirror for reflecting the collimated laser beam along with the axis of said nozzle, and a lens for focalizing of the laser beam reflected at the tip of said nozzle to a focalizing point.

15. A head for the continuous precision machining on three-dimensional bodies as claimed in claim 14, wherein said nozzle has, between its tip and said lens, an entry for a process gas for laser cutting.

16. A head for the continuous precision machining on three-dimensional bodies as claimed in claim 14, wherein said focalizing point of said laser beam is coinciding with said intersection point.

17. A head for the continuous precision machining on three-dimensional bodies as claimed in any claim 14, wherein said focalizing point of said laser beam does not coincide with said intersection point.

18. A head for the continuous precision machining on three-dimensional bodies as claimed in claim 1, wherein said fastening means has an angular range of at least ±360°, said second part has with reference to said first part an angular range not lower than ±60°, and said third part has with reference to said second part an annular range not lower than ±60°.

19. A head for the continuous precision machining on three-dimensional bodies as claimed in claim 1, wherein said terminal means has a linear range not lower than ±40 mm.

20. Machining equipment, comprising a head for the continuous precision machining on three-dimensional bodies as claimed in claim 1.

21. Machining equipment as claimed in claim 20, having mechanical cartesian axes uncoupled from the axes of said head.

22. Machining equipment as claimed in claim 21, further comprising actuations only with reference to its mechanical cartesian axes for machining operations with a low linear and/or angular acceleration, and actuations only with reference to the axes of said head for machining operations with a high linear and/or angular acceleration.

23. Machining equipment as claimed in claim 22, wherein the axes of said head are independent from one another.

\* \* \* \* \*